3,337,515
SHORTSTOPPING OF EMULSION POLYMERIZATION OF SYNTHETIC RUBBERS

Gerardus E. La Heij and Jacques A. Waterman, Amsterdam, Netherlands, assignors to Shell Oil Company, New York, N.Y., a corporation of Delaware
No Drawing. Filed Oct. 7, 1963, Ser. No. 314,487
Claims priority, application Netherlands, Mar. 25, 1963, 290,630
8 Claims. (Cl. 260—84.1)

This invention relates to a process for the preparation of polymers or copolymers of butadiene-1,3 hydrocarbons by means of emulsion polymerization (including copolymerization) in an aqueous medium at temperatures below 30° C. with the aid of redox systems that contain metal compounds, for example compounds of iron, cobalt, nickel, copper, maganese, chromium, vanadium and other metals, which may occur in various valence states and may change reversibility from one valence state to another under the prevailing conditions.

The process according to the invention relates in particular to the preparation of homopolymers and copolymers of dienes.

Whenever hereinafter the terms "polymers" and "polymerization" are used, they should be understood to include "copolymers" and "copolymerization," respectively.

The process concerned is of special importance for the preparation of homopolymers and copolymers of butadiene-1,3 hydrocarbon monomers having under normal conditions a boiling point of less than 80° C. Examples of such monomers are butadiene-1,3, isoprene, 2,3-dimethylbutadiene-1,3, piperylene, 2-methylpentadiene-1,3, and 4-methylpentadiene-1,3.

The process is particularly significant for the preparation of homopolymers of butadiene-1,3. It is, however, also applicable to polymerizations involving monomers with higher boiling points, for instance to homo- or copolymerizations of isoprene or copolymerization of dienes with vinyl-substituted aromatic hydrocarbons, styrene or with acrylic compounds such as methyl methacrylate.

In the said emulsion polymerization processes, the polymerization or copolymerization is generally stopped by mixing the latices with a compound that, under the prevailing conditions, almost immediately makes the catalyst system inactive (short stopping agent). A highly effective and much applied method of stopping the polymerization reaction is the one in which sodium dimethyl dithiocarbamate is added to the latex. A serious drawback to the use of this compound is, however, that an undesirable discoloration of the polymers or copolymers often occurs. This is particularly evident with redox catalyst systems that contain iron compounds. The other short stops known so far, among which are organic nitrogen compounds, such as hydroxylamine and dialkylhydroxylamine, also cause to a greater or less degree undesired discoloration of the polymer if it is exposed to heat or is stored at normal temperature for a prolonged period.

Now, in accordance with the present invention, a process has now been found under emulsion polymerization conditions in the presence of a redox catalyst system and in the presence of heavy metal water soluble salt activations by which polymers or copolymers can be prepared which not only have not undergone any objectionable color change, but even have a particular whiteness and moreover exhibit favorable ageing properties.

According to the invention the polymerization reaction is stopped by mixing the latices, in the presence of or absence of other substances that may inhibit or terminate this reaction, with salts of mercaptocarboxylic acids having the formula

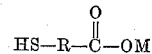

wherein M is a monovalent radical of the group consisting of alkali metal radicals and ammonium, R is a hydrocarbyl radical having 1–10 carbon atoms.

Examples of such mercaptocarboxylic acid salts are, in the first place, the alkali metal (Na, K, Li) or ammonium salts of mercaptoacetic acid. These salts have been found to be extremely effective. However, their effectiveness remains conditional upon the polymerization temperature being lower than 30° C. Other mercaptocarboxylic acids of which the alkali metal and/or ammonium salts according to the invention can be applied are, for example, mercaptolactic acid, alpha-mercaptobutyric acid and mercaptosalicylic acid, as well as the corresponding compounds in which one or two hydrogen atoms of the hydrocarbon radical are replaced by one or two chlorine atoms.

As a rule these salts will be added to the polymerizing latex, preferably as an aqueous solution.

The most suitable polymerization temperatures are between 0 and 20° C.; it is, however, equally possible to apply the process concerned to polymerizations that take place at temperatures of from 0 to −50° C.

The process according to the invention is preferably carried out in polymerizations in which the metal compounds of the redox system are completely (or almost completely) complexed; that is to say, that the polymerization is carried out in the presence of enough complexing agent that at least 90% of the metal compound was caused to react with it to form a water-soluble complex compound. These complexing agents therefore constitute part of the redox system and are already present at the beginning of the polymerization. A very suitable complexing agent is, for instance, a mixture of 90% of tetrasodium salt of ethylene-diaminetetraacetic acid and 10% of monosodium salt of N,N di(alpha-hydroxyethyl) glycine. Another suitable complexing agent is the disodium salt of ethylene diaminetetraacetic acid.

The redox recipes applied in the polymerization include an initiator (a persulfate or hydroperoxide) and an activator, which as a rule consists of several components (among which is the metal compound). These recipes are often varied so that other quantities are applied of the initiator and/or of the activator. The specified values can then be designated as the 100% or the 100/100 level, the desired modifications being expressed in percentages thereof, for instance 50% level or initiator/activator level=50/50.

Activators usually comprise heavy metal (Nos. 23–29 of the Periodic Table) water soluble salts, such as ferrous sulfate, cobalt chloride, cuprous chloride, nickel sulfate, etc.

When applying the process concerned, it may in certain cases be advisable to polymerize at such an initiator level that, at reaching the desired conversion, the initiator is nearly consumed. Suitable peroxides include p-methane hydroperoxide and phenyl cyclohexyl hydroperoxide. Persulfate recipes are utilized, of which potassium persulfate is typical. This may, for instance, be effectuated by choosing a low ratio between the initiator level and the activator level, for instance between 0.4 and 0.6.

If the latices are obtained by polymerization exclusively of monomers with a boiling point under normal conditions of less than 80° C., the removal of unconverted monomer from the latices, after the latices have been mixed with the mercaptocarboxylic acids, is preferably effected at temperatures that are likewise below 80° C. If desired, steam or an inert gas, for instance nitrogen, can be passed through the dispersions during this process. If necessary, the removal of the monomer can also be carried out with the aid of vacuum distillation.

The present process may, however, as already stated, also be applied to latices that have been obtained by polymerization of one or more monomers whose boiling point under normal conditions is higher than 80° C. The removal of unconverted monomer then preferably takes place by treatment with steam at temperatures that are likewise above 80° C. In such cases, it is advisable to mix the latices not only with the thiocarboxylic acid salt, but also with an alkali nitrite. This prevents renewed polymerization of one or more monomers at that higher temperature. Furthermore, by this means the formation of branched or cross-linked structures is prevented.

These undesirable phenomena can also be avoided or suppressed by taking care that the influence of the higher temperature lasts as briefly as possible, and by rapidly cooling the latex after removal of the monomer. If necessary, the unconverted monomers can be removed at a lower temperature by applying reduced pressure. When the removal of monomers takes place at temperatures between 50 and 80° C. it is recommended that the latex should not be kept at this temperature too long, for instance not longer than eight hours, and preferably for as short a time as possible. As a rule it is preferable to cool down latices from which unconverted monomer has been removed at temperatures above 40° C., to below 40° C.

In certain cases it is desirable in the process according to the invention to mix the latices before, during or after removal of unconverted monomer with one or more other substances that may check or stop the polymerization or cross-link reaction, and/or with one or more agents that are capable of reducing and/or complexing the metal compounds.

Such substances may be admixed shortly before, simultaneously with or after the contact of the latex with the mercaptoacetic acid salt. In this manner the favorable effect of the mercapto fatty acid salt can sometimes be further enhanced.

Of the substances that can inhibit or stop the polymerization and which may be applied together with the mercapto carboxylic acid salts, mention may be made of, for instance, alkali metal or amine salts of dialkyldithiocarbamic acids, dinitrochlorobenzene, alkyl polysulfides, hydroxylamine, N,N-dialkylhydroxyamine, alkali or ammonium dithionites, alkyl phenols, p-ntirosodimethylaniline, di-tert-butyl-hydroquinone and p-tert-butylbenzocatechol. Furthermore, for other representatives reference may be made to Houben-Weyl, "Methoden der Organischen Chemie," vol. XIV/1 (1961), Part 1, 439–441.

Complexing agents that may be added to the latex are, for instance, ethylenediaminetetraacetic acid and the salts thereof, N-oxyethylenediaminetriacetic acid, diethylenetriaminepentaacetic acid, oxalic acid and citric acid.

Examples of compounds that may, in particular have a reducing effect upon the metal compound, are sodium dithionite, formaldehyde, the sodium formaldehyde sulfoxylate, salts of hypophosphorous acid, glucose and ascorbic acid.

The process according to the invention, which can be applied either batchwise or continuously, can, moreover, take place using any initiator, activator, reducing agent, complex-forming agent, buffer, oxygen-combining substance, emulsifier, dispersing agent, modifier and additive that lowers the freezing point of water, as described with reference to redox recipes containing metal compounds in Bovey, Kolthoff, Medalia and Meehan, "Emulsion Polymerization," 1955; Whitby, "Synthetic Rubbers," 1954 (pp. 224–228); and Journal of Applied Chemistry 12 (1962) 469–478.

Recipes that can, in particular, be used for the polymerization are especially those of the types 1500, 1502, 1509 and 1712.

The quantities of the mercaptocarboxylic acid salts, as well as of each of the other admixtures, are preferably between 0.01 and 0.3% by weight calculated on the total quantity of the monomer applied in polymerization. Very good results have been obtained by using 0.1–0.2 parts by weight of sodium thioglycolate per 100 parts by weight of monomer.

The invention is illustrated by the following examples.

EXAMPLE I 1,3-butadiene was polymerized at 5° C. in emulsion using recipe 1500 and an activator-initiator level (%) of 50/50. The mixture in which polymerization took place was composed of the following constituents. All the quantities given are expressed in parts by weight per 100 parts by weight of monomer.

| | |
|---|---:|
| Butadiene | 100 |
| p-Menthane hydroperoxide (initiator; 50% level) (calculated on pure peroxide) | 0.06 |
| Tert-dodecyl mercaptan | 0.35 |
| An emulsifier solution consisting of: | |
| Water | 190 |
| Rosinate (containing 80% rosin acid soap) (calculated on pure rosin acid soap) | 4.7 |
| $Na_3PO_4$ 12 aq | 0.70 |
| Mixtures of sodium alkylaryl sulfonates | 0.02 |
| Chelating agent (disodium salt of ethylene-diaminetetraacetic acid 2 mole of water of crystallization) | 0.01 |
| pH of emulsifier solution | 10.0±0.2 |
| An activator solution consisting of: | |
| $FeSO_4$ 7 aq (50% level) | 0.02 |
| Chelating agent (see above) (50% level) | 0.025 |
| Sodium formaldehde sulfoxylate 2 aq (50% level) | 0.05 |
| Water | 10 |

When polymerization had continued until 59% of the butadiene had been polymerized, the reaction was terminated by the addition of a 10% weight aqueous solution of the sodium salt of mercaptoacetic acid. The quantity of this solution that was added was 0.15 parts by weight per 100 parts by weight of monomer. Most of the unconverted butadiene was then discharged from the reactor by opening the latter at room temperature and stirring the contents a little longer.

The latex was then divided into three portions. One of the portions (I) was directly coagulated, another portion (II) was before coagulation first completely freed of remnants of unconverted monomer by a steam treatment for 2 hours at 100° C., while the third portion (III) was not coagulated until it had been stored for 4 weeks at room temperature and without having undergone a steam treatment.

With each of the 3 portions the coagulation of the latex was carried out by first adding a 10% alkaline NaCl solution with a pH of 10 and then dilute sulfuric acid, at which the pH dropped to less than 7. After separation, washing out and drying for 10 hours at 70° C., the Hoekstra and Monney plasticity values of the three resultant polymers were measured. The results are recorded in Table I.

TABLE I

| | Portion I | Portion II | Portion III |
|---|---:|---:|---:|
| Hoekstra value | 18 | 20 | 17 |
| Mooney value | 22 | 23 | 23 |

Each of the 3 polymers had a bright white appearance.

The polymer obtained from portion II was kept at a temperature of 100° C. for 12 hours, after which the color of the product was still white.

EXAMPLE II

A number of copolymerizations were carried out in emulsion at 5° C., applying various activator and initiator levels. The following recipe was used, which is based on an initiator and activator level of 100%.

All the quantities stated are again expressed in parts by weight per 100 parts by weight of monomer.

| | |
|---|---|
| Butadiene | 70 |
| Styrene | 30 |
| p-Methane hydroperoxide (initiator; 100% level) (calculated on pure peroxide) | 0.12 |
| Tert-dodecyl mercaptan | 0.22–0.24 |

An emulsifier solution consisting of:

| | |
|---|---|
| Water | 190 |
| Na salts of acids ex $C_{14}$–$C_{18}$ cracked olefins [a] (calculated on pure soap) | 4.7 |
| $Na_3PO_4$ 12 aq | 0.70 |
| Mixture of alkylaryl sulfonates | 0.02 |
| Chelating agent (disodium salt of ethylene diamine tetra-acetic acid) | 0.01 |
| Initial pH of emulsifier solution | 10.0±0.2 |

An activator solution consisting of:

| | |
|---|---|
| $FeSO_4$.7 aq (100% level) | 0.04 |
| Chelating agent (as above) (100% level) | 0.05 |
| Sodium formaldehyde sulfoxylate 2 aq (100% level) | 0.10 |
| Water | 10 |

[a] See J. of Applied Chem., 12 (1962), 469–478.

The initiator and activator levels applied in the experiments are proportional.

EXAMPLE III

The following series of experiments was carried out applying an activator/initiator level (%) of 50/50, a mercaptan content of 0.22 part by weight per 100 parts by weight of monomer and rosin soap as the emulsifier. When a conversion of 58–59% had been reached the sodium salt of mercaptoacetic acid (SMAA) was admixed as the short stopping agent, its quantities being varied. For comparison, in one of the experiments no short stop was used and in another experiment sodium dimethyl dithiocarbamate (SDD) instead of sodium mercaptoacetate. The resultant latices were thereupon kept at 5° C. for 20 hours while the still closed reactors were slowly rotated. The reactors were then opened and allowed to reach room temperature, the greater part of the butadiene evaporating. The remnants of monomer, principally of styrene, still present were then removed by treatment with steam at 100° C. for ½ hour. The polymer was coagulated and further worked up in the same way as described in Example I.

Of the rubbers obtained, the Hoekstra plasticity was determined and of some also the iron content. The results are recorded in Table II. The product of experiment III–A was of a pale yellow color, that of experiment III–B was grayish; the other rubbers were all very light to a bright white.

TABLE II

| Experiment No. | "Short Stop" Parts by w. Per 100 p.b.w. of Monomer | Conversion Immediately After Short Stopping, Percent | Conversion After 20 Hours at 5° C. After Short Stopping, Percent | Hoekstra Value of Polymer | Iron Content of Polymer, Percent w.×10⁻⁴ |
|---|---|---|---|---|---|
| III–A | | 59 | 92 | >70 | |
| III–B | SDD, 0.1 | 59 | 59 | 43 | ca. 15 |
| III–C | SMAA, 0.05 | 58 | 59 | 51 | |
| III–D | SMAA, 0.1 | 58 | 58 | 46 | |
| III–E | SMAA, 0.2 | 58 | 59 | 44 | ca. 9 |
| III–F | SMAA, 0.4 | 59 | 59 | 42 | |
| III–G | SMAA, 0.8 | 58 | 58 | 44 | |

The product obtained in experiment No. III–E was kept at a temperature of 100° C. for 12 hours, after which the rubber still had a white appearance.

EXAMPLE IV

Two experiments were performed at an activator/initiator level (%) of 40/40, a mercaptan content of 0.23 parts by weight per 100 parts by weight of monomer and with the sodium salt of acids ex $C_{14}$–$C_{18}$ cracked olefins as the emulsifier. In one of the experiments the short stop was SDD in another SMAA. In both cases, the quantity was 0.1 part by weight per 100 parts by weight of monomer. Each of the latices was divided into 2 portions. With the aid of steam these portions were completely freed of unconverted monomer. The steam treatment was applied for 15 or for 120 minutes. The Mooney and Hoekstra plasticity values of the rubbers obtained after working up were determined. The results are given in Table III.

TABLE III

| Experiment No. | Short Stop | | Mooney Value After Steam Treatment Lasting— | | Hoekstra Value After Steam Treatment Lasting— | |
|---|---|---|---|---|---|---|
| | Compound | Added at Conversion of, percent | 15 min. | 120 min. | 15 min. | 120 min. |
| IV–A | SDD | 60 | 49 | 49 | 34 | 47 |
| IV–B | SMAA | 70 | 67 | 67 | 47 | 43 |

The rubbers obtained in experiment IV–A were all strongly colored, the products of experiment IV–B showed a bright white appearance also after the steam treatment lasting 120 minutes.

EXAMPLE V

The copolymerization described in Example IV were repeated at an activator/initiator level (%) of 50/50, a mercaptan content of 0.24 part by weight per 100 parts by weight of monomer and rosin soap as the emulsifier. The short stops were added when the conversion was 62%. The amount added was here 0.15 part by weight per 100 parts by weight of monomer. After the latices had been kept at 5° C. for 20 hours the conversion was found not to have risen any further. The latices were then completely freed of monomer by a steam treatment and worked up as described in Example I. The product obtained with the aid of SMAA was white, in contrast to the grayish rubber of experiment V-A in which SDD had been used as the short stop.

The rubbers were next milled at 50° C. and 100° C., both for 15 minutes and for 1 hour. The Hoekstra plasticity was determined before and after milling. The results are recorded in Table IV.

TABLE IV

| Experiment No. | Short Stop | Before Rolling | Hoekstra Value After Rolling at— | | | |
|---|---|---|---|---|---|---|
| | | | 50° C. | | 100° C. | |
| | | | 15 min. | 1 hour | 15 min. | 1 hour |
| V-A | SDD | 32 | 31 | 28 | 28 | 27 |
| V-B | SMAA | 31 | 31 | 29 | 28 | 27 |

It follows from the table that, as regards Hoekstra plasticity, both polymers show the same behavior during milling at 50° C. and 100° C. and that SMAA was not found to have any plastification or oxidation-promoting effect (resulting in breakdown or cross-linking in the polymer).

We claim as our invention:

1. The process for emulsion polymerization which comprises:
   (1) emulsion polymerizing monomers of the group consisting of butadiene-1,3-hydrocarbons and mixtures with copolymerizable monomers containing a $$CH_2=C<$$

group, said polymerization being conducted at a temperature below 30° C. in the presence of
   (a) an initiator of the group consisting of persulfates and hydroperoxides;
   (b) a water-soluble activator of the group consisting of heavy metal chlorides and heavy metal sulfates;
   (c) a metal complexing agent of the group consisting of ethylene amine salts, polyethylene polyamine salts, oxalic acid and citric acid; and
   (d) metal reducing compounds of the group consisting of sodium dithionite, formaldehyde, sodium formaldehyde sulfoxylate, salts of hypophosphorous acid, glucose and ascorbic acid;
   (2) and, after formation of rubbery polymer, terminating said polymerization while the latex contains unreacted polymerizable monomer by adding 0.01–0.3% by weight, based on the monomer content of the original charge, of a salt of a mercaptocarboxylic acid having the general configuration $$HS-R-\overset{\overset{O}{\|}}{C}-OM$$

wherein M is a radical of the group consisting of alkali metal and ammonium and R is a hydrocarbyl radical having 1–10 carbon atoms.

2. A process according to claim 1 wherein polymerization is conducted in the presence of a hydroperoxide polymerization catalyst.

3. A process according to claim 2 wherein a redox polymerization recipe containing an iron salt activator is utilized.

4. A process according to claim 1 wherein the monomer comprises a mixture of butadiene 1,3-hydrocarbons and mono-vinyl-substituted aromatic hydrocarbons.

5. A process according to claim 1 wherein the salt is a salt of a mercapto fatty acid.

6. The process according to claim 1 in which the polymerizable material is a mixture of butadiene and styrene, the initiator is a hydroperoxide, the water-soluble activator has an atomic number between 23 and 29 and M in the general formula is sodium.

7. A process according to claim 6 wherein the pH of the aqueous phase of the emulsion at the time of adding the mercaptoacetic acid salt is lower than 7.5.

8. A process according to claim 7 wherein the heavy metal is ferrous sulfate.

References Cited

UNITED STATES PATENTS

| 2,380,905 | 7/1945 | Stewart | 260—84.3 |
| 2,485,682 | 10/1949 | Weber | 260—84.3 |
| 2,568,648 | 9/1951 | McCool | 260—84.3 |

JOSEPH L. SCHOFER, *Primary Examiner.*

JAMES A. SEIDLECK, *Examiner.*